United States Patent
Farnsworth et al.

(10) Patent No.: US 8,391,231 B2
(45) Date of Patent: *Mar. 5, 2013

(54) METHOD AND APPARATUS HAVING IMPROVED HANDLING OF STATE TRANSITIONS

(75) Inventors: Andrew John Farnsworth, Bromsgrove (GB); Supratim Chakraborty, Wednesbury (GB)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/300,119

(22) Filed: Nov. 18, 2011

(65) Prior Publication Data

US 2012/0064877 A1 Mar. 15, 2012

(51) Int. Cl.
*G01R 31/08* (2006.01)
(52) U.S. Cl. ......... 370/329; 455/458; 455/450; 370/331
(58) Field of Classification Search .............. 455/414.1, 455/445, 458; 370/329, 331
See application file for complete search history.

(56) References Cited

U.S. PATENT DOCUMENTS

| | | | |
|---|---|---|---|
| 7,142,520 B1* | 11/2006 | Haverinen et al. | 370/311 |
| 2003/0194992 A1* | 10/2003 | Kim et al. | 455/414.1 |
| 2004/0073321 A1* | 4/2004 | Kondo | 700/28 |
| 2004/0087320 A1* | 5/2004 | Kim et al. | 455/458 |
| 2005/0003836 A1* | 1/2005 | Inoue et al. | 455/458 |
| 2005/0009527 A1* | 1/2005 | Sharma | 455/445 |
| 2005/0054298 A1* | 3/2005 | Chen | 455/67.11 |
| 2005/0163074 A1* | 7/2005 | Mella et al. | 370/329 |
| 2005/0176437 A1* | 8/2005 | Mir | 455/450 |
| 2005/0266846 A1* | 12/2005 | Kim | 455/436 |
| 2006/0035642 A1* | 2/2006 | Farnsworth et al. | 455/450 |
| 2006/0142020 A1* | 6/2006 | Mueckenheim et al. | 455/453 |
| 2008/0182594 A1* | 7/2008 | Flore et al. | 455/458 |
| 2008/0280567 A1* | 11/2008 | Sharma | 455/73 |
| 2008/0287120 A1* | 11/2008 | Kuo | 455/425 |
| 2009/0181710 A1* | 7/2009 | Pani et al. | 455/509 |
| 2009/0196256 A1* | 8/2009 | DiGirolamo et al. | 370/331 |

FOREIGN PATENT DOCUMENTS

EP 1628442 A1 2/2006

OTHER PUBLICATIONS

EP Search and Examination Report; EP Application No. 08155908.0; Nov. 19, 2008; 5 pgs.
ETSI TS 125 331 v.7.8.0; Universal Mobile Telecommunications System (UMTS); Radio Resource Control (RRC); Protocol Specification (3GPP TS 25.331 version 7.8.0 Release 7) Apr. 2008; 82 pgs.

\* cited by examiner

*Primary Examiner* — Jinsong Hu
*Assistant Examiner* — Nathan Taylor
(74) *Attorney, Agent, or Firm* — Conley Rose, P.C.; J. Robert Brown, Jr.

(57) ABSTRACT

A method, in a wireless communications device, for transitioning between communication states, the wireless communications device compliant for use in a Universal Mobile Telecommunications System (UMTS), the method comprising: checking for radio bearer mapping information for the communication state being transitioned to prior to sending an update message, where the transition between communication states is not a transition from a paging state to a bidirectional communication state using shared channels; and transitioning to the state to be transitioned to using the checked radio bearer mapping information for that state and sending the update message.

7 Claims, 8 Drawing Sheets

METHOD AND APPARATUS HAVING IMPROVED HANDLING OF STATE TRANSITIONS

CROSS-REFERENCE TO RELATED APPLICATIONS

The present application is a continuation of U.S. patent application Ser. No. 12/117,298, filed May 8, 2008, by Andrew Farnsworth, et al., entitled "Method and Apparatus Having Improved Handling of State Transitions" which is incorporated by reference herein as if reproduced in its entirety.

BACKGROUND

This application relates to telecommunication systems in general, having for example application in UMTS (Universal Mobile Telecommunications System).

BRIEF DESCRIPTION OF THE DRAWINGS

Embodiments will now be described, by way of example only, with reference to the attached drawings, in which.

DETAILED DESCRIPTION OF THE DRAWINGS

Figure 1:
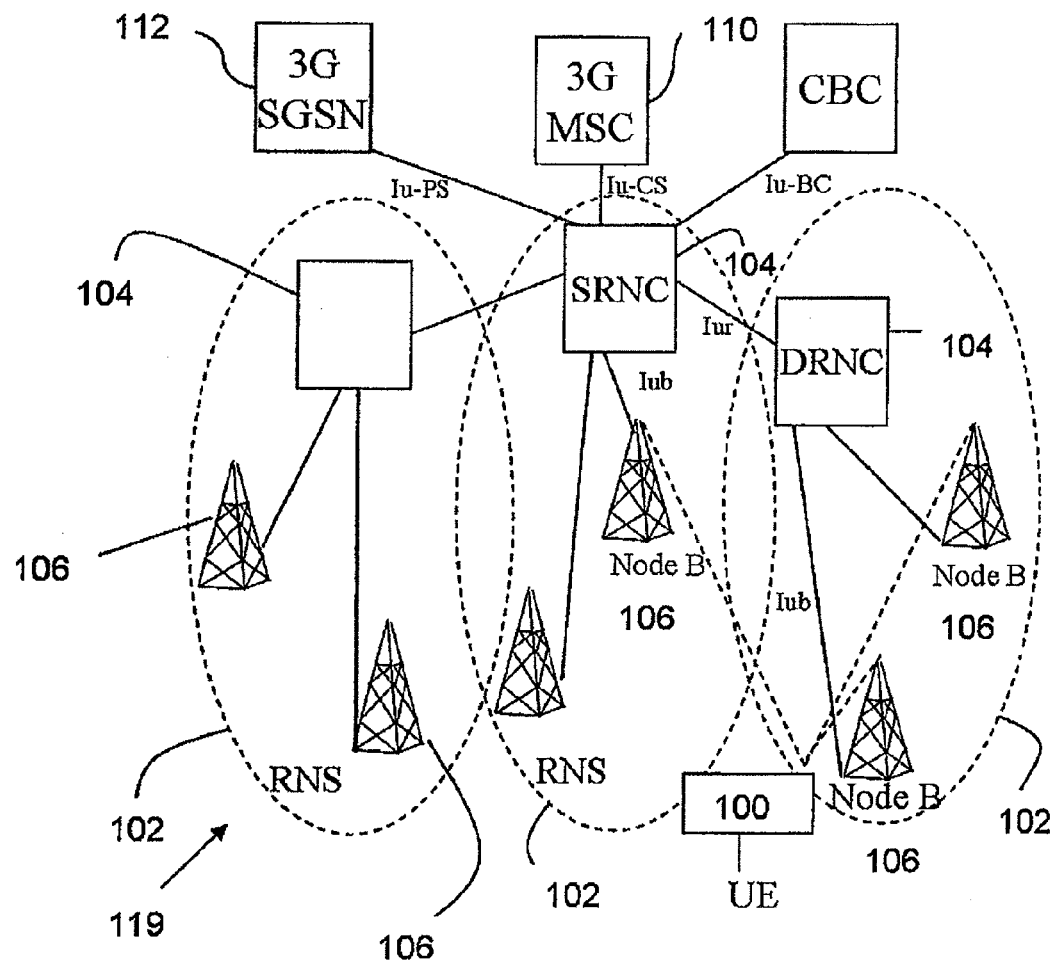
FIG. 1 is a schematic diagram showing an overview of a network and a UE.

This application relates to a method, in a wireless communications device, for transitioning between communication states. This application also relates to a method, in a wireless communications device, for transitioning from a paging state to a bidirectional communication state using shared channels. Further, this application relates to a wireless communications network. Further still, this application relates to a computer program and a computer program product.

In a typical cellular radio system, mobile user equipment (UE) communicates via a radio access network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice signals and/or data signals with the radio access network.

In the following, reference will be made to UMTS and to particular standards. However it should be understood that the present disclosure is not intended to be limited to any particular mobile telecommunications system or standard.

The radio access network covers a geographical area divided into a plurality of cell areas. Each cell area is served by at least one base station, which in UMTS may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless communications device, generally referred to as user equipment (UE), which complies with the 3GPP specifications for the UMTS protocol. The UE is arranged to communicate with a UMTS Terrestrial Radio Access Network (UTRAN). The 3GPP 25.331 technical specification v7.4.0, incorporated herein by reference, addresses the subject of Radio Resource Control protocol for the UE-UTRAN radio interface. Section 8.5.21 of the 25.331 specification defines the actions required relating to radio bearer mapping, including processing of the update messages CELL UPDATE CONFIRM or URA UPDATE CONFIRM.

The procedures defined for radio bearer mapping checks allow a UE to establish whether it has encountered an invalid configuration. If the UE meets conditions which satisfy a criterion that is defined as an invalid configuration, the UE sets variable INVALID_CONFIGURATION to TRUE. The UE may also move to idle mode, and release any established signaling connections and any established radio access bearers.

The UE has four connected states: URA_PCH, CELL_PCH, CELL_DCH and CELL_FACH. Each of these can be characterized by a level of user activity, as follows.

URA_PCH and CELL_PCH are paging states in which no communication from UE to UTRAN is possible and minimum radio and battery resources of the UE are consumed. When the UE has data to send, it moves to CELL_FACH state and then transmits a Cell update message to the UTRAN indicating that it has uplink data to send. When the UTRAN has downlink data to send to a UE in a paging state, the UTRAN sends a paging message to the UE, and the UE moves to CELL_FACH and then responds with a Cell update message to indicate in which cell it is located.

CELL_DCH is a dedicated channel state in which the UE has a dedicated channel for high data rate communication with the UTRAN.

CELL_FACH is a bidirectional communication state using shared channels in which communication between the UE and the UTRAN is possible at low data rates only.

On reception of any of the reconfiguration messages which cause the UE to move from CELL_DCH to CELL_PCH or URA_PCH, the UE may or may not have radio bearer mapping information for the SRBs 1-4 mapped onto the Random Access Channel (RACH) and the Forward Access Channel (FACH).

In accordance with the 25.331 specification, three signaling radio bearers (SRB1-SRB3) need to be configured for use with messages sent on a Dedicated Control Channel (DCCH), and one signaling radio bearer (SRB4) is optional. The signaling radio bearers are configured by the Radio Resource Controller (RRC) using setup information transmitted by the UTRAN to the UE.

Before moving from CELL_PCH or URA_PCH to CELL_FACH, the UE applies the procedures from the 25.331 specification at section 8.5.21. If the UE does not have any stored RACH/FACH mappings for SRBs 1-4, then it will enter into idle mode. When the UE enters idle mode, communication between the UE and the UTRAN is interrupted until a connection is re-established.

There are thus proposed strategies for a method and apparatus for transitioning from a paging state to a bidirectional communication state using shared channels. Further, there are proposed strategies for receiving an update message. These strategies may reduce the occurrence of the UE entering idle mode. A number of such strategies are detailed below.

Other aspects and features of the proposed strategy will become apparent to those ordinarily skilled in the art upon review of the following description of specific embodiments of a method and apparatus having improved handling of state transitions.

According to the approaches described herein, it is recognized that typically a third generation wireless communication device upon moving from a paging state (such as URA_PCH or CELL_PCH) to CELL_FACH state for performing a CELL or URA update procedure will try to check the radio bearer information stored for SRB 1 to 4 and if the check fails will move to IDLE state.

Accordingly, the requirement to perform checking of the radio bearers mapping information for SRBs 1-4 in CELL_PCH/URA_PCH is changed, so that UE is not required to perform any of the checks mentioned in section 8.5.21 in this particular case. While performing CELL update procedure in CELL_PCH or URA_PCH state or URA update procedure in URA_PCH state, the UE transitions to CELL_FACH state and then sends CELL UPDATE/URA UPDATE on SRB0.

If SRB1 does not have a FACH mapping, then UTRAN will send CELL UPDATE CONFIRM/URA UPDATE CONFIRM message on SRB0. On reception of CELL UPDATE CONFIRM, if the UTRAN has instructed the UE to move into CELL_DCH the UE can directly configure DCH and move to CELL_DCH. So the UE does not require RACH/FACH mappings for SRBs 1-4.

On reception of URA UPDATE CONFIRM or CELL UPDATE CONFIRM, if the UTRAN has instructed the UE to move into CELL_PCH or URA_PCH, the UE does not need RACH or FACH mapping and can directly jump to CELL_PCH or URA_PCH as instructed. This saves unnecessary checking of the mappings of SRBs 1-4 and configuring RACH or FACH mappings whilst still allowing an exit from CELL_PCH or URA_PCH state.

Accordingly, radio bearer mapping checks are reduced upon exiting CELL_PCH or URA_PCH. For example, for the UE to perform a CELL or URA update procedure the UE will first transition from CELL_PCH or URA_PCH to CELL_FACH in order to send a CELL UPDATE or URA UPDATE message. The UE is arranged to omit radio bearer mapping checks when moving into the CELL_FACH state. Thus, even if the appropriate radio bearers are not set up, then the UE does not move to idle state. The UE waits for the CELL UPDATE CONFIRM or URA UPDATE CONFIRM message from the UTRAN. This will be transmitted on SRB0 if the UE doesn't have FACH mapping for SRB1.

Accordingly, aspects of the method disclosed comprise a wireless communications device omitting the step of checking for radio bearer mapping information for a bidirectional communication state using shared channels when sending an update message.

Another problem is that one or more logical channels used by the UE in PCH may not have a usable configuration for FACH. According to the 25.331 specification at section 8.6.4.8, if the UE attempts to transition from PCH to FACH when there is a multiplexing option that maps a logical channel corresponding to a TM-RLC entity onto FACH, then the UE identifies an invalid configuration and enters idle mode. However, in some cases this results in the UE entering idle mode unnecessarily. For example, if the UE moves from PCH to FACH to send an update message, and in response to this the network sends an update confirm message instructing the UE to transition to DCH state, then no radio bearer or logical channel mapping is required for FACH.

There is provided a method, in a wireless communications device, for transitioning between communication states, the method comprising: checking for radio bearer mapping information for the communication state being transitioned to prior to sending an update message, the check performed conditional upon the particular communication states the wireless communications device is transitioning between; such that when the wireless communications device transitions from a paging state to a bidirectional communication state using shared channels, the step of checking for radio bearer mapping information for a bidirectional communication state using shared channels is omitted.

There is also provided a method, in a wireless communications device, for transitioning between communication states, the wireless communications device compliant for use in a Universal Mobile Telecommunications System (UMTS), the method comprising: checking for radio bearer mapping information for the communication state being transitioned to prior to sending an update message, where the transition between communication states is not a transition from a paging state to a bidirectional communication state using shared channels; and transitioning to the state to be transitioned to using the checked radio bearer mapping information for that state and sending the update message.

There is further provided a method, in a wireless communications device, for transitioning from a paging state to a bidirectional communication state using shared channels, the method comprising performing the transition when the UE has one or more logical channels for which there is no usable configuration for the bidirectional communication state using shared channels.

The wireless communications device can also transition from the paging state to the bidirectional communication state using shared channels when the UE has at least one logical channel for which there is a usable configuration for the bidirectional communication state using shared channels.

There is further provided a wireless communications device arranged to transition from a paging state to a bidirectional communication state using shared channels by: omitting the step of checking for radio bearer mapping information for a bidirectional communication state using shared channels, and sending an update message.

The wireless communications device may be further arranged to: receive an update confirm message instructing the wireless communications device to transition to a particular state; and in response to the update confirm message, check for radio bearer mapping information for the particular state.

There is further provided a wireless communications network arranged to, in response to receiving an update message from a wireless communications device: send an update confirm message to the wireless communications device on a signaling radio bearer having a fixed mapping, where the wireless communications network has not sent radio bearer mapping information to the wireless communications device for a mappable radio bearer. The signaling radio bearer having a fixed mapping may be SRB0. The mappable radio bearer may be SRB1.

Embodiments of the above methods may prevent the wireless communications apparatus entering idle mode unnecessarily.

The method disclosed herein may be implemented in a user equipment device of a wireless communications network. Referring to the drawings, FIG. 1 is a schematic diagram showing an overview of a network and a user equipment device. Clearly in practice there may be many user equipment devices operating with the network but for the sake of simplicity FIG. 1 only shows a single user equipment device 100. For the purposes of illustration, FIG. 1 also shows a radio access network 119 (UTRAN) used in a UMTS system having a few components. It will be clear to a person skilled in the art that in practice a network will include far more components than those shown.

The network 119 as shown in FIG. 1 comprises three Radio Network Subsystems (RNS) 102. Each RNS has a Radio Network Controller (RNC) 104. Each RNS 102 has one or more Node B 102 which are similar in function to a Base Transmitter Station of a GSM radio access network. User Equipment UE 100 may be mobile within the radio access network. Radio connections (indicated by the straight dotted lines in FIG. 1) are established between the UE and one or more of the Node Bs in the UTRAN.

Figure 2:
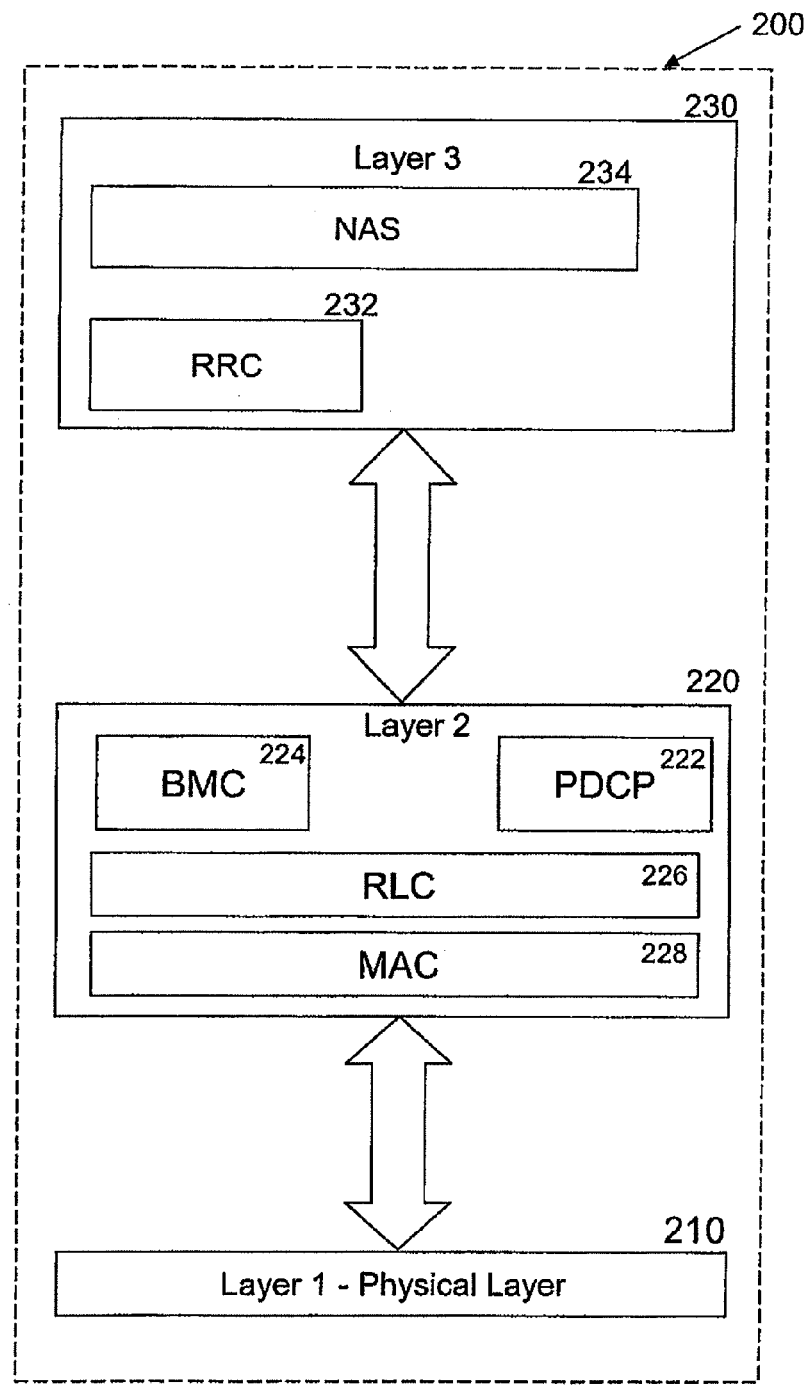
FIG. 2 is a block diagram illustrating a UE protocol stack.

Within each UE of a UMTS network, a protocol stack controls the operation of the device. FIG. 2 is a block diagram illustrating such a UE protocol stack. A Radio Resource Controller (RRC) block 232 is a sub layer of Layer 3 230 of a UMTS protocol stack 200. The RRC 232 exists in the control plane only and provides an information transfer service to the non-access stratum NAS 234. The RRC 232 is responsible for controlling the configuration of radio interface Layer 1 210 and Layer 2 220. When the UTRAN needs to change the UE configuration it issues a message to the UE containing a command to invoke a specific RRC procedure. A MAC 228 is a layer 2 protocol that handles communications between the RLC 226 and the Physical Layer 210.

A Radio Bearer (RB) is a service provided by layer 2 of the protocol stack for the transfer of data between the UE and the UTRAN. The RRC (Radio Resource Control) connection process establishes the RBs (Radio Bearers) available for usage by RRC messages on logical channels. Examples of the logical channels are DCCH (Dedicated Control Channel) and CCCH (Common Control Channel). The Radio Bearers are identified as SRBs (Signaling Radio Bearers).

The presently disclosed method may equally be applied to User Plane Radio Bearers. User plane radio bearers may carry user data.

Figure 3:
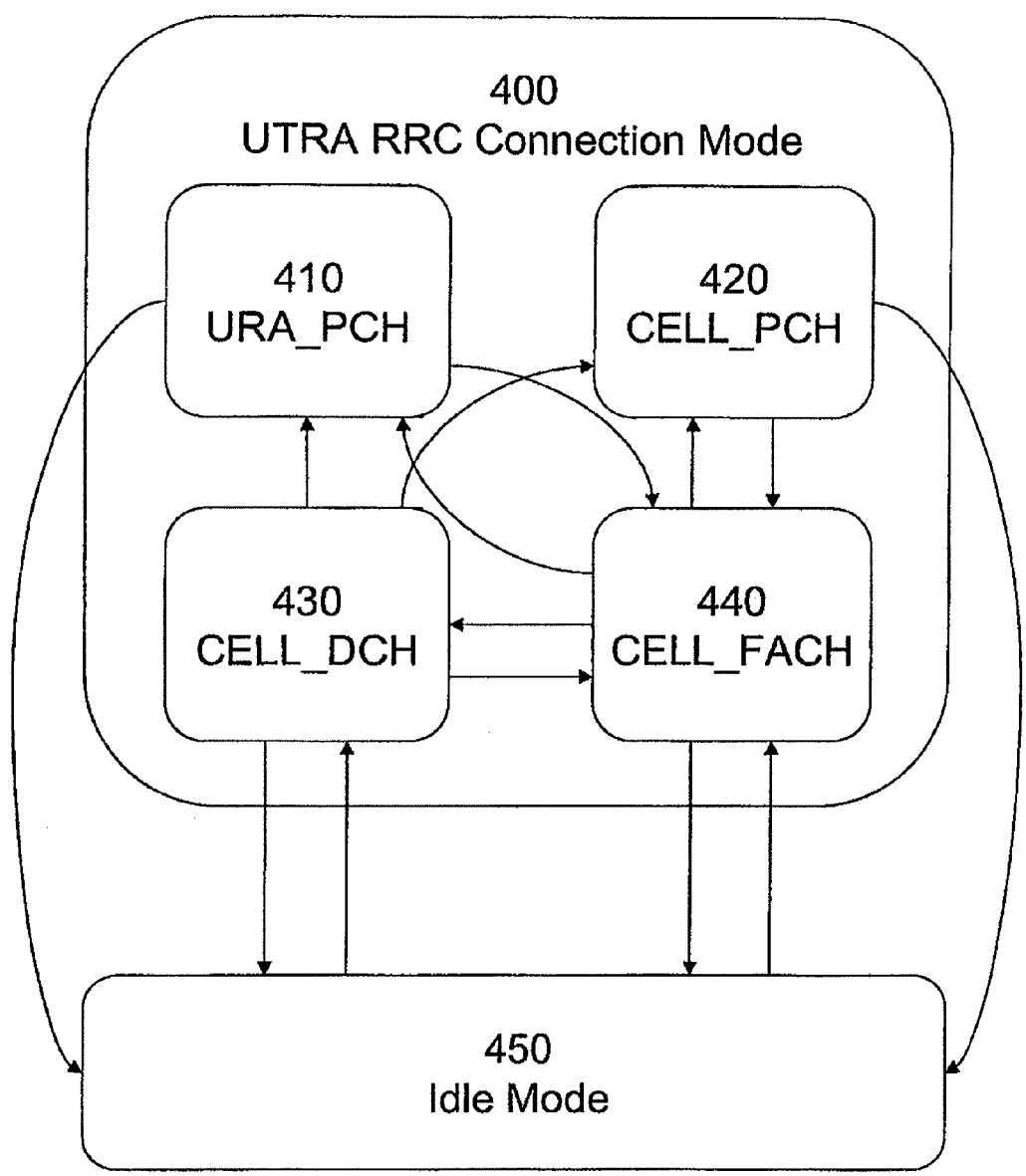
FIG. 3 shows some state transitions available to a device.

FIG. 3 shows the RRC states in UTRA RRC Connected Mode 400, and idle mode 450. FIG. 3 also shows transitions between the UTRA RRC connected mode 400 and Idle Mode 450 and furthermore the transitions within UTRA RRC connected mode.

UTRA RRC connected mode 400 comprises 4 states: URA_PCH 410, CELL_PCH 420, CELL_DCH 430, and CELL_FACH 440. The UE can be in any one of these 4 states. Each state is characterized by a level of user activity, as described above.

The arrows in FIG. 3 indicate state transitions available to the UE. Upon establishing an RRC connection, the UE transitions from idle mode 450 to CELL_DCH 430 or CELL_FACH 440. The UE may transition from any of the 4 RRC connection states back to idle mode 450. Transitions between the 4 RRC connection states within UTRA RRC connected mode 400 are shown, in particular the UE may transition to or from CELL_FACH 440 and any of the other three states.

Figure 4A:
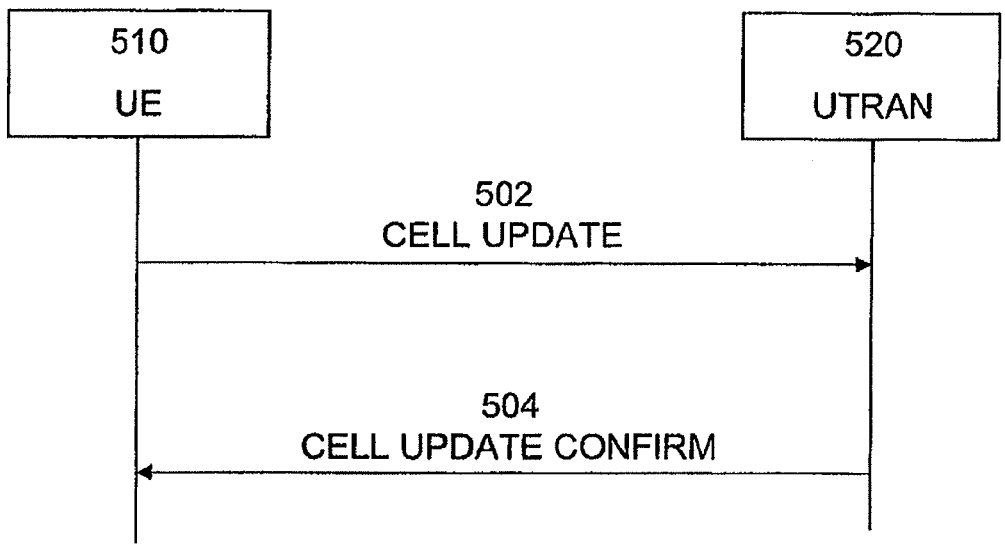
FIGS. 4A and 4B show the typical operation of CELL UPDATE message and URA UPDATE message procedures respectively.

FIG. 4A shows the CELL UPDATE message in operation. A UE 510 sends a CELL UPDATE message 502 to a UTRAN 520. In response the UTRAN 520 sends a CELL UPDATE CONFIRM message 504 to the UE 510. The CELL UPDATE CONFIRM message may include RB information elements, Transport channel information elements; and/or Physical channel information elements. An information element included in the CELL UPDATE CONFIRM message 504 is RRC State Indicator. The RRC State Indicator may take the value CELL_DCH, CELL_FACH, CELL_PCH or URA_PCH. Upon receipt of this information element the UE will enter the state in accordance with sub-clause 8.6.3.3 of the 25.331 specification and as dictated by the procedure governing the received CELL UPDATE CONFIRM message.

Figure 4B:
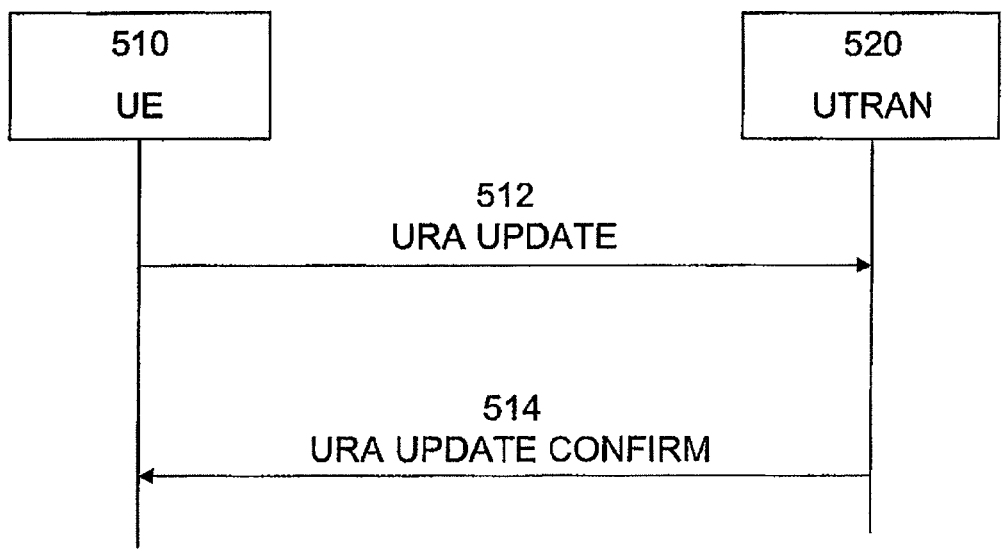

FIG. 4B shows the URA UPDATE message in operation. A UE 510 sends a URA UPDATE message 512 to a UTRAN 520. In response the UTRAN 520 sends a URA UPDATE CONFIRM message 514 to the UE 510. The URA UPDATE CONFIRM message may include information elements. An information element included in the URA UPDATE CONFIRM message 514 is RRC State Indicator. The RRC State Indicator may take the value CELL_FACH, CELL_PCH or URA_PCH. Upon receipt of this information element the UE will enter the state in accordance with sub-clause 8.6.3.3 of the 25.331 specification and as dictated by the procedure governing the received URA UPDATE CONFIRM message.

Typically, on reception of any of the reconfiguration messages when the UE moves from CELL_DCH to CELL_PCH or URA_PCH, the UE may not have radio bearer mapping information for the SRBs 1 to 4 mapped onto RACH and FACH. If after moving from CELL_PCH or URA_PCH to CELL_FACH, the UE applies the procedures from specification 25.331 section 8.5.21, the UE may enter into idle mode as a consequence of not having any stored RACH or FACH mappings for SRBs 1 to 4. Lack of stored radio bearer mapping information will cause the UE to move to idle mode. The stored information is not required for CELL_DCH, CELL_PCH or URA_PCH and so the transition to idle mode is unnecessary.

However, according to the method disclosed herein the requirement to perform checking of the radio bearers mapping information for SRBs 1-4 is changed, so that the UE omits these checks. In particular, when the UE transitions from a PCH state to a FACH state, the UE omits the check for radio bearer mappings for CELL_FACH. Such a transition occurs when the UE needs to send a CELL UPDATE MESSAGE or a URA UPDATE MESSAGE to the UTRAN.

While performing a CELL update procedure in CELL_PCH or URA_PCH state or URA update procedure in URA_PCH state, the UE moves to the CELL_FACH state and then sends a CELL UPDATE message or a URA UPDATE message on SRB0. If SRB1 does not have a FACH mapping, then the UTRAN responds with a CELL UPDATE CONFIRM or URA UPDATE CONFIRM message on SRB0. Otherwise, the UTRAN would respond on SRB1 or SRB0.

When the UE receives a CELL UPDATE CONFIRM message, if the UTRAN instructs the UE to move into CELL_DCH, then the UE can directly configure the dedicated channel and move to CELL_DCH.

Similarly, when the UE receives a URA UPDATE CONFIRM message, if the UTRAN instructs the UE to move into either the CELL_PCH state or the URA_PCH state, the UE does not need RACH or FACH mappings and can directly jump to the CELL_PCH state or the URA_PCH state.

The UE does not require RACH or FACH mappings for SRBs 1 to 4 in order to perform a URA or a CELL update. Accordingly, in the presently disclosed method, the step of checking the radio bearer mappings for FACH and/or RACH is omitted. This will save unnecessary checking of the mappings of SRBs 1 to 4 and configuring RACH or FACH mappings whilst still allowing an exit from CELL_PCH or URA_PCH state.

Figure 5A:
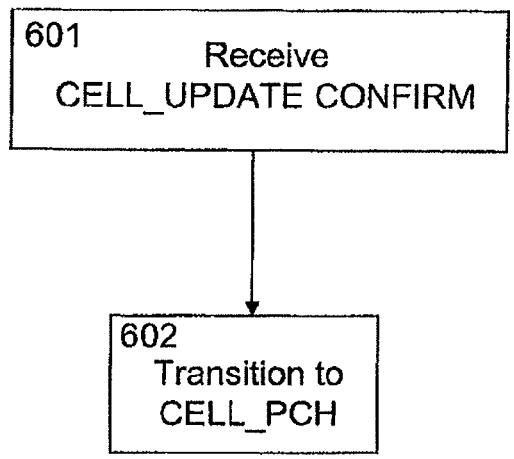
FIGS. 5A, 5B, 5C, 5D and 5E show state transitions of a UE in response to the UE receiving CELL UPDATE CONFIRM or URA UPDATE CONFIRM messages.

FIG. 5A shows a state transition of a UE in response to the UE receiving a CELL UPDATE CONFIRM message. At step 601 a UE receives a CELL UPDATE CONFIRM message. The received CELL UPDATE CONFIRM message indicates the UE should transition to the CELL_PCH state. At step 602 the UE transitions to CELL_PCH.

Figure 5B:
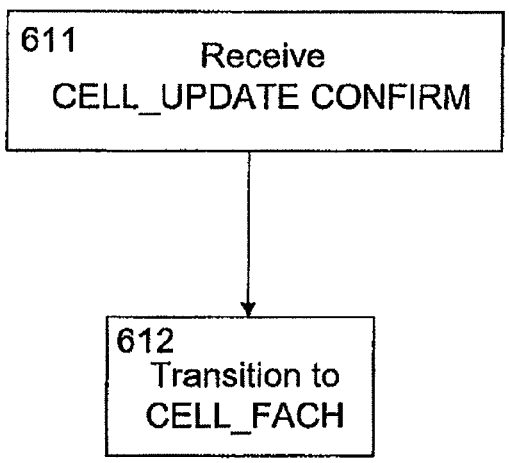

FIG. 5B shows a state transition of a UE in response to the UE receiving a CELL UPDATE CONFIRM message. At step 611 a UE receives a CELL UPDATE CONFIRM message. The received CELL UPDATE CONFIRM message indicates the UE should transition to the CELL_FACH state. At step 612 the UE transitions to CELL_FACH.

Figure 5C:
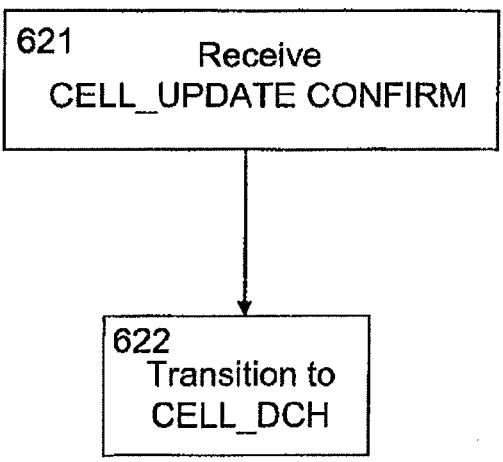

FIG. 5C shows a state transition of a UE in response to the UE receiving a CELL UPDATE CONFIRM message. At step 621 a UE receives a CELL UPDATE CONFIRM message. The received CELL UPDATE CONFIRM message indicates the UE should transition to the CELL_DCH state. At step 622 the UE transitions to CELL_DCH.

Figure 5D:
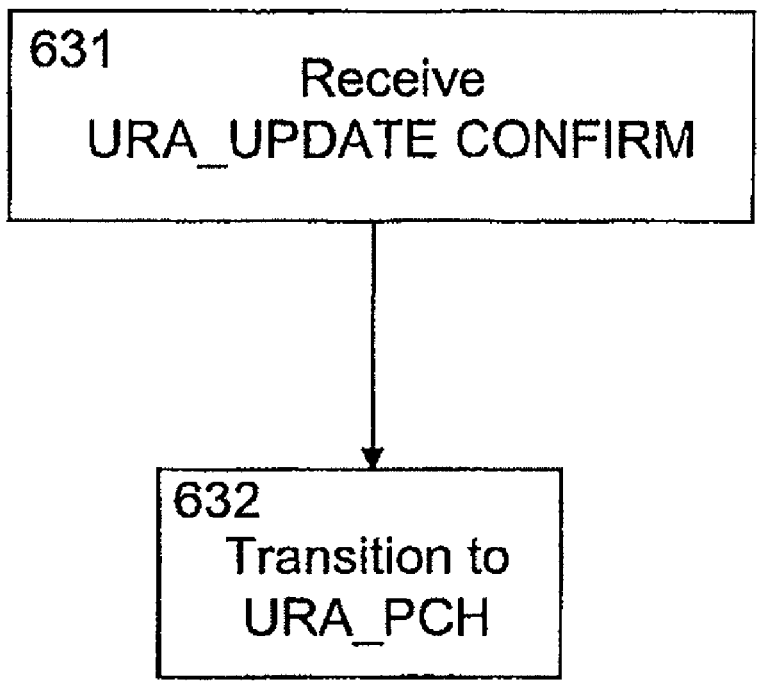

FIG. 5D shows a state transition of a UE in response to the UE receiving a URA UPDATE CONFIRM message. At step 631 a UE receives a URA UPDATE CONFIRM message. The received URA UPDATE CONFIRM message indicates the UE should transition to the URA_PCH state. At step 632 the UE transitions to URA_PCH.

Figure 5E:
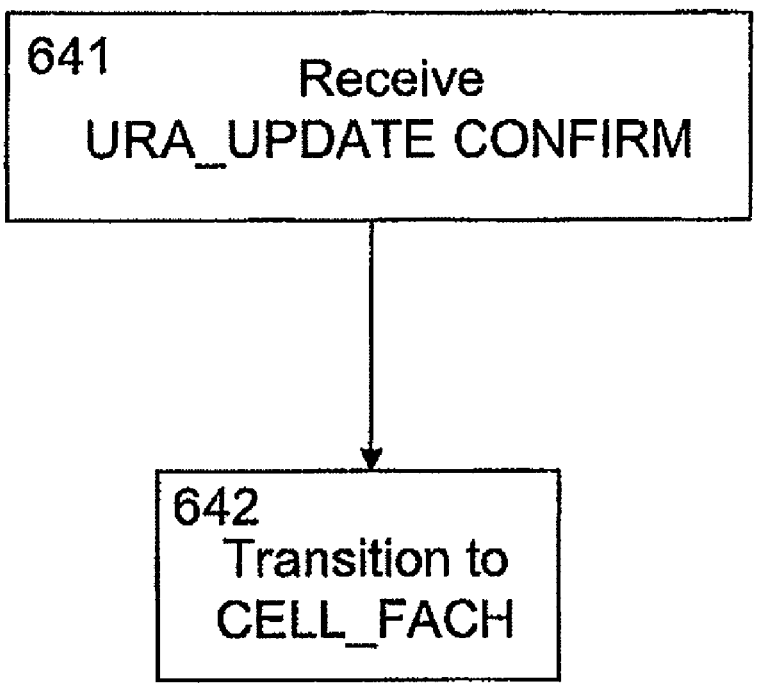

FIG. 5E shows a state transition of a UE in response to the UE receiving a URA UPDATE CONFIRM message. At step 641 a UE receives a URA UPDATE CONFIRM message. The received URA UPDATE CONFIRM message indicates the UE should transition to the CELL_FACH state. At step 642 the UE transitions to CELL_FACH.

Figure 6:
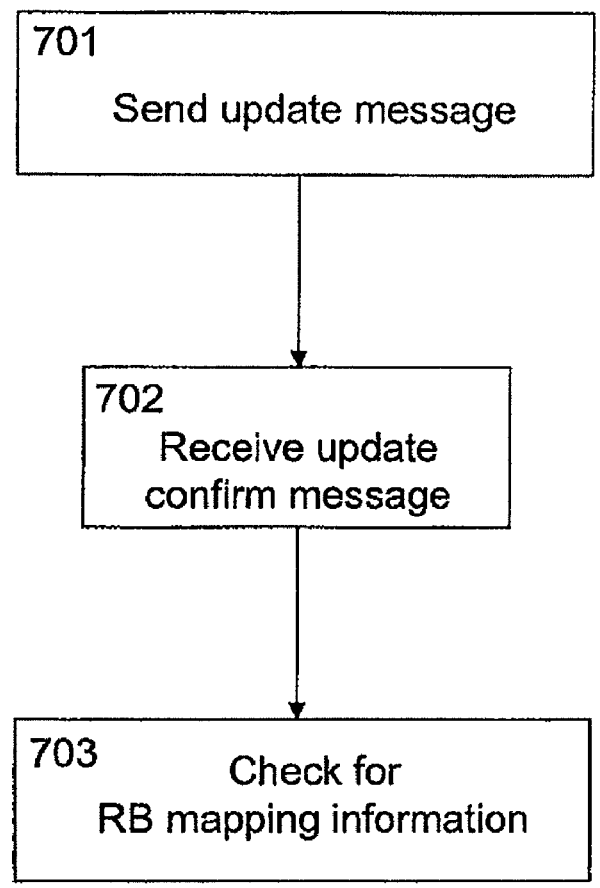
FIG. 6 illustrates a method implemented in a wireless communications device.

FIG. 6 illustrates a method implemented in a UE or other wireless communications device. At step 701 the device sends an update message to the wireless communications network. In response to the update message, the network sends an update confirm message to the device. At step 702 the device receives the update confirm message. After receiving the update confirm message, the device checks for radio bearer mapping information, this is step 703.

Figure 7:
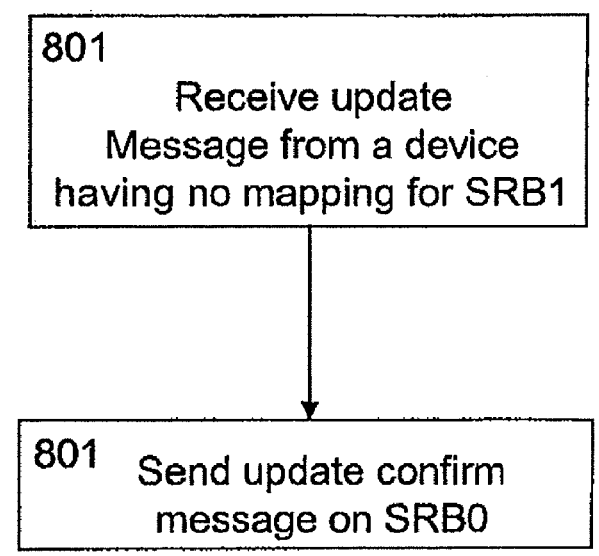
FIG. 7 illustrates a method implemented in a wireless communications network.

FIG. 7 illustrates a method implemented in a UTRAN or other wireless communications network. At step 801, the network receives an update message from a wireless communications device having no mapping for SRB1. At step 802, and in response to the update message, the network sends an update confirm message to the device on SRB0.

Figure 8:
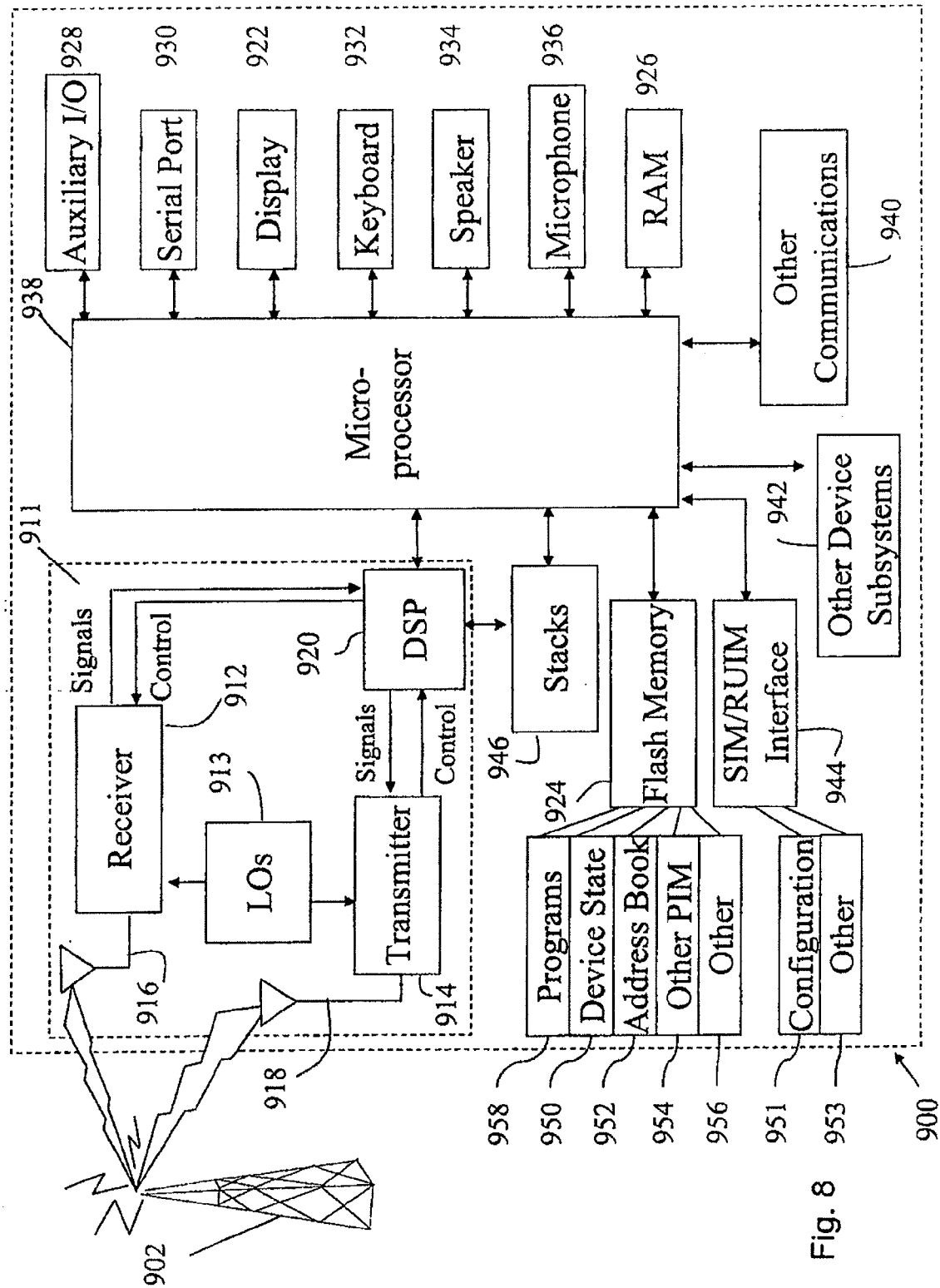
FIG. 8 is a block diagram illustrating a mobile device, which can act as a UE and co-operate with the apparatus and methods of FIGS. 1 to 7.

Turning now to FIG. 8, this is a block diagram illustrating a mobile device, which can act as a UE and co-operate with the apparatus and methods of FIGS. 1 to 7, and which is an exemplary wireless communication device. Mobile station 900 is preferably a two-way wireless communication device having at least voice and data communication capabilities. Mobile station 900 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 900 is enabled for two-way communication, it will incorporate a communication subsystem 911, including both a receiver 912 and a transmitter 914, as well as associated components such as one or more, preferably embedded or internal, antenna elements 916 and 918, local oscillators (LOs) 913, and a processing module such as a digital signal processor (DSP) 920. As will be apparent to those skilled in the field of communications, the particular design of the communication subsystem 911 will be dependent upon the communication network in which the device is intended to operate. For example, mobile station 900 may include a communication subsystem 911 designed to operate within the Mobitex™ mobile communication system, the DataTAC™ mobile communication system, GPRS network, UMTS network, or EDGE network.

Network access requirements will also vary depending upon the type of network 902. For example, in the Mobitex and DataTAC networks, mobile station 900 is registered on the network using a unique identification number associated with each mobile station. In UMTS and GPRS networks, however, network access is associated with a subscriber or user of mobile station 900. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 900 will be unable to carry out any other functions involving communications over the network 902. The SIM interface 944 is normally similar to a card-slot into which a SIM card can be inserted and ejected like a diskette or PCMCIA card. The SIM card can have approximately 64K of memory and hold many key configuration 951, and other information 953 such as identification, and subscriber related information.

When required network registration or activation procedures have been completed, mobile station 900 may send and receive communication signals over the network 902. Signals received by antenna 916 through communication network 902 are input to receiver 912, which may perform such common receiver functions as signal amplification, frequency down conversion, filtering, channel selection and the like, and in the example system shown in FIG. 8, analog to digital (A/D) conversion. A/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog conversion, frequency up conversion, filtering, amplification and transmission over the communication network 902 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

Mobile station 900 preferably includes a microprocessor 938 which controls the overall operation of the device. Communication functions, including at least data and voice communications, are performed through communication subsystem 911. Microprocessor 938 also interacts with further device subsystems such as the display 922, flash memory 924, random access memory (RAM) 926, auxiliary input/output (I/O) subsystems 928, serial port 930, keyboard 932, speaker

934, microphone 936, a short-range communications subsystem 940 and any other device subsystems generally designated as 942.

Some of the subsystems shown in FIG. 8 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. Microprocessor 938, in addition to its operating system functions, preferably enables execution of software applications on the mobile station. A predetermined set of applications that control basic operations, including at least data and voice communication applications for example, will normally be installed on mobile station 900 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 902. In a preferred embodiment, the PIM data items are seamlessly integrated, synchronized and updated, via the wireless network 902, with the mobile station user's corresponding data items stored or associated with a host computer system. Further applications may also be loaded onto the mobile station 900 through the network 902, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the mobile station 900.

In a data communication mode, a received signal such as a text message or web page download will be processed by the communication subsystem 911 and input to the microprocessor 938, which preferably further processes the received signal for output to the display 922, or alternatively to an auxiliary I/O device 928. A user of mobile station 900 may also compose data items such as email messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of mobile station 900 is similar, except that received signals would preferably be output to a speaker 934 and signals for transmission would be generated by a microphone 936. Alternative voice or audio I/O subsystems, such as a voice message recording subsystem, may also be implemented on mobile station 900. Although voice or audio signal output is preferably accomplished primarily through the speaker 934, display 922 may also be used to provide an indication of the identity of a calling party, the duration of a voice call, or other voice call related information for example.

Serial port 930 in FIG. 8, would normally be implemented in a personal digital assistant (PDA)-type mobile station for which synchronization with a user's desktop computer (not shown) may be desirable, but is an optional device component. Such a port 930 would enable a user to set preferences through an external device or software application and would extend the capabilities of mobile station 900 by providing for information or software downloads to mobile station 900 other than through a wireless communication network. The alternate download path may for example be used to load an encryption key onto the device through a direct and thus reliable and trusted connection to thereby enable secure device communication.

Other communications subsystems 940, such as a short-range communications subsystem, is a further optional component which may provide for communication between mobile station 900 and different systems or devices, which need not necessarily be similar devices. For example, the subsystem 940 may include an infrared device and associated circuits and components or a Bluetooth™ communication module to provide for communication with similarly enabled systems and devices.

In some embodiments, a method is provided, in a wireless communications device, for transitioning between communication states. The method comprising checking for radio bearer mapping information for the communication state being transitioned to prior to sending an update message. The check performed being conditional upon the communication states the wireless communications device is transitioning between, such that when the wireless communications device transitions from a paging state to a bidirectional communication state using shared channels, the step of checking for radio bearer mapping information for a bidirectional communication state using shared channels is omitted.

The method also provided that step of omitting comprises suppressing the check for radio bearer mapping information for a bidirectional communication state using shared channels. The further comprises receiving an update confirm message instructing the wireless communications device to transition to a second state, and in response to the update confirm message, checking for radio bearer mapping information for the second state. In some embodiments the update message is a CELL UPDATE or a URA UPDATE message. The update confirm message may be a CELL UPDATE CONFIRM message or a URA UPDATE CONFIRM message received in response to the CELL UPDATE message or the URA UPDATE message respectively.

In some embodiments, a method is provided in a wireless communications device, for transitioning from a paging state to a bidirectional communication state using shared channels. The method comprising performing the transition when the User Equipment has one or more logical channels for which there is no usable configuration for the bidirectional communication state using shared channels. The paging state may be a CELL_PCH or URA_PCH. The bidirectional communication state using the shared channels is CELL_FACH. In some embodiments, the radio bearer mapping information may comprise at least one: of Signaling Radio Bearer mapping information and User Plane Radio Bearer mapping information.

In some embodiments, the present disclosure may provide a wireless communications device arranged, in use, to implement the methods described above, and wherein the wireless communications device is further arranged to communicate in a mobile telecommunications system according to the UMTS standard.

The present disclosure also provides for a computer program comprising program code arranged, in use, to perform the above methods This disclosure may also include computer program product comprising program code stored on a computer readable medium, the program code arranged, in use, to perform as described above.

EXTENSIONS AND ALTERNATIVES

In the foregoing specification, the disclosure has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have shown steps being carried out in a particular order. However, it would be clear to a person skilled in the art that the order of the steps performed, where the context permits, can be varied and to that extent the ordering of the steps as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a UE or UTRAN or other user equipment or access network components, a combination of multiple such components for example in communication with one another or a sub-network or full network of such components.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights.

What is claimed is:

1. A method, in a wireless communications device, for transitioning from a paging state to a bidirectional communication state using shared channels, the method comprising performing the transition when the UE has one or more signalling radio bearers for which there is no usable configuration for the bidirectional communication state using shared channels.

2. The method of claim 1, wherein the paging state is CELL_PCH or URA_PCH.

3. The method of claim 1, wherein the bidirectional communication state using shared channels is CELL_FACH.

4. The method of claim 1 wherein a signalling radio bearer for which there is no useable configuration comprises a signalling radio bearer for which there is no valid radio bearer mapping.

5. A wireless communications device arranged, in use, transition from a paging state to a bidirectional communication state using shared channels, the wireless communications device arranged to perform the transition when the UE has one or more signalling radio bearers for which there is no usable configuration for the bidirectional communication state using shared channels.

6. A non-transitory computer readable medium comprising a computer program comprising program code arranged, in use in a wireless communications device to cause the wireless communications device to transition from a paging state to a bidirectional communication state using shared channels, the computer program causing the wireless communications device to perform the transition when the UE has one or more signalling radio bearers for which there is no usable configuration for the bidirectional communication state using shared channels.

7. A non-transitory computer readable medium comprising a computer program product comprising program code stored on a computer readable medium, the program code arranged, in use in a wireless communications device, to cause the wireless communications device to transition from a paging state to a bidirectional communication state using shared channels, the computer program product causing the wireless communications device to perform the transition when the UE has one or more signalling radio bearers for which there is no usable configuration for the bidirectional communication state using shared channels.

* * * * *